Dec. 1, 1970    S. POSNER    3,543,319
PORTABLE SELF-PROPELLED TRAILER WASHING DEVICE
Filed Aug. 12, 1968    4 Sheets-Sheet 1

INVENTOR
SAMUEL POSNER

BY
Max R. Millman
ATTORNEY

INVENTOR
SAMUEL POSNER

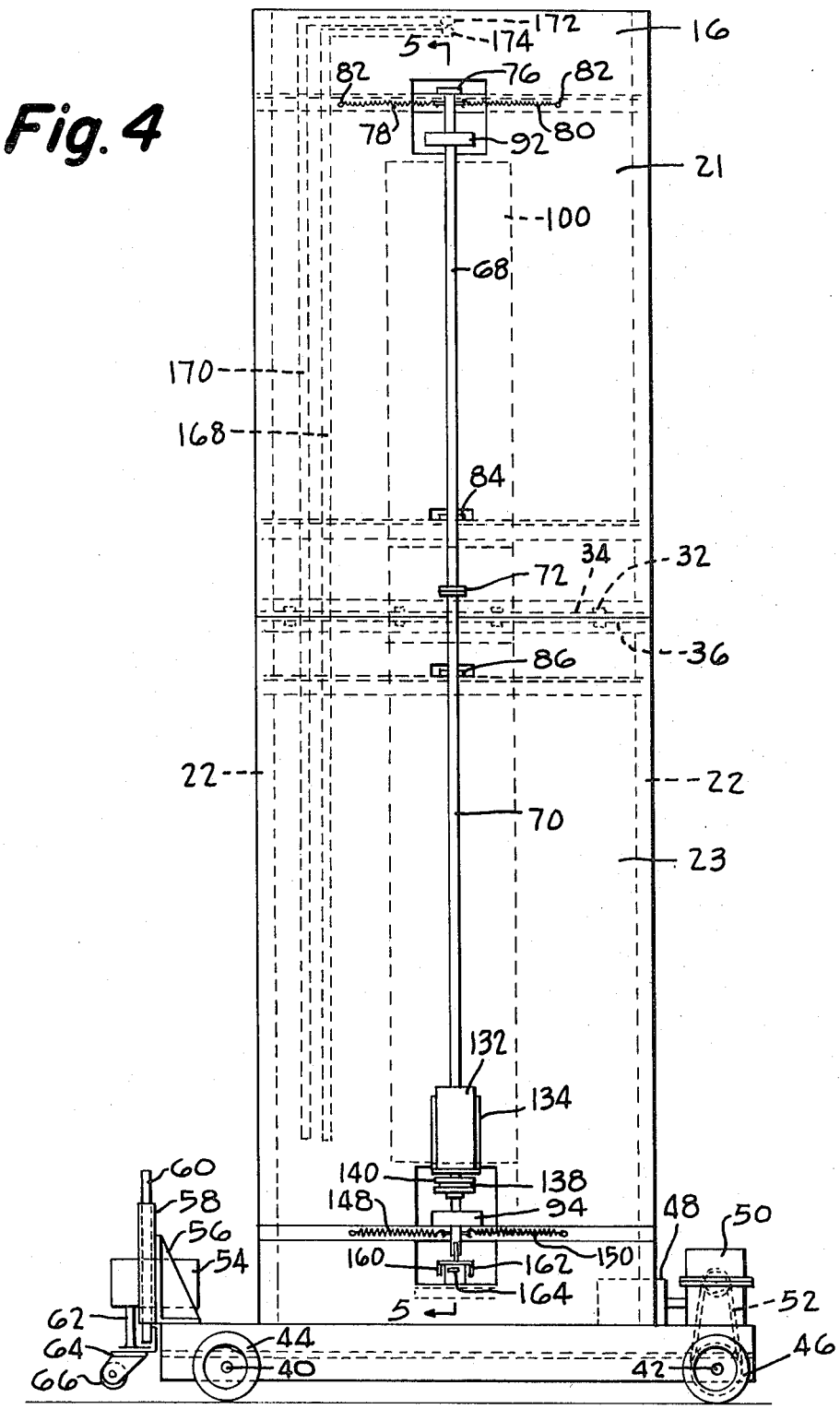

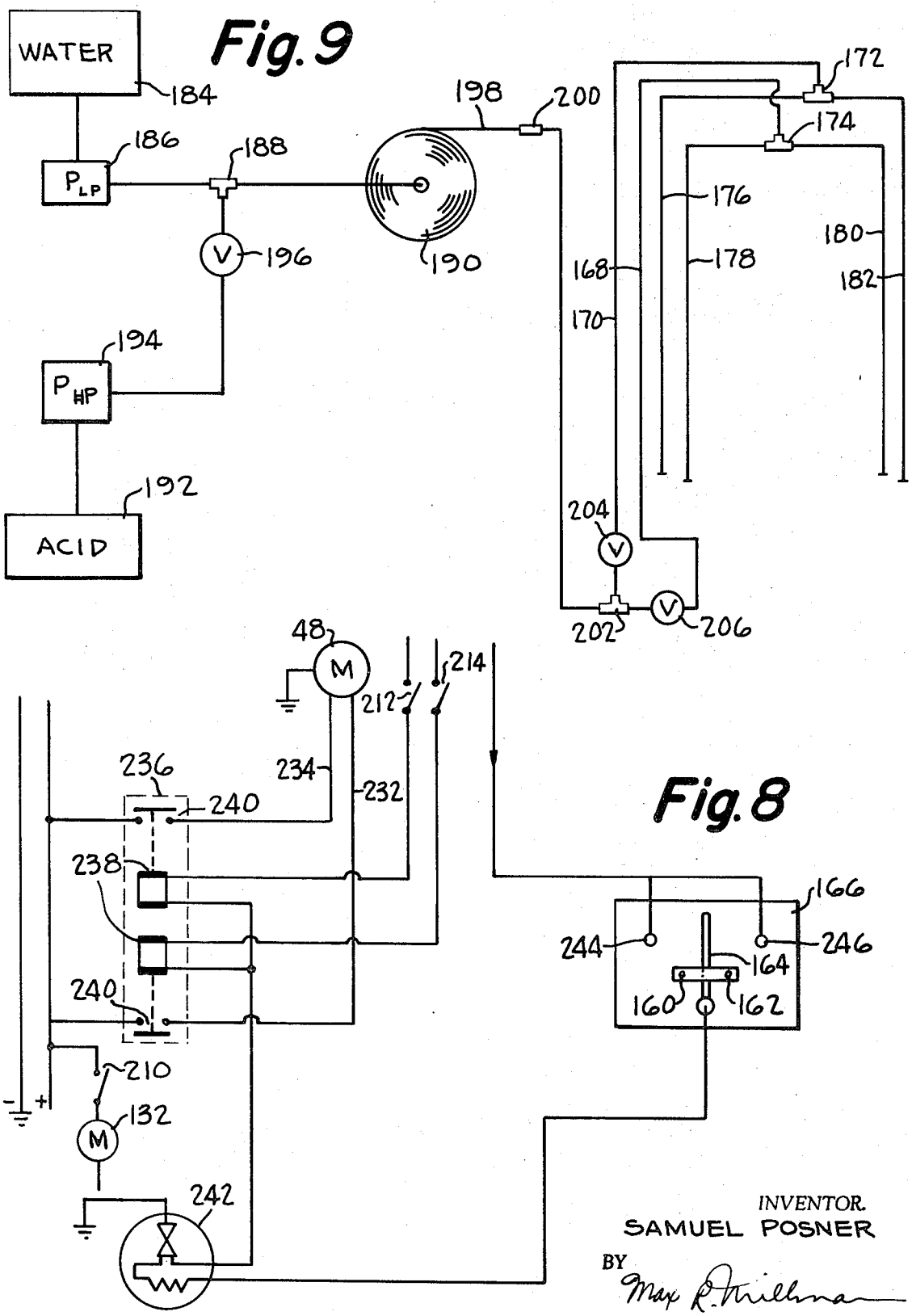

United States Patent Office 3,543,319
Patented Dec. 1, 1970

3,543,319
PORTABLE SELF-PROPELLED TRAILER WASHING DEVICE
Samuel Posner, Philadelphia, Pa., assignor to Power-Wash, Inc., a corporation of Pennsylvania
Filed Aug. 12, 1968, Ser. No. 751,940
Int. Cl. B60s 3/06
U.S. Cl. 15—21    11 Claims

ABSTRACT OF THE DISCLOSURE

A trailer washing device which can be readily transported to a yard or depot where trailers are normally stored to thus obviate the necessity of manually washing the trailers or erecting a permanent washing bay through which the trailers must be driven, the device comprising a substantially U-shaped frame carrying spray pipes and brushes adapted to straddle the trailer body and including means to cause the frame to be self-propelled to properly align itself with the trailer body throughout its travel back and forth relative to the trailer body and to permit movement and steering of the frame in close quarters.

---

This invention relates to a portable mobile device for washing vehicles in general and trailer bodies in particular, the primary object of which is to effect thorough washing and brushing of each body by moving the device back and forth relative thereto, thus obviating the necessity of washing the trailer bodies manually or of providing a more costly permanent wash bay through which the vehicle must be driven.

Another object of the invention is to provide a portable mobile trailer washing device which consists of a substantially U-shape frame carrying spray pipes and brushes which includes means for self-propelling the frame and guidance means to keep the frame properly aligned with the trailer body throughout its travel to thus ensure thorough washing.

Another object of the invention is to provide a portable mobile washing device of the character described in which the frame is sectional so that it can be made compact for transportation and can be readily and easily erected for use at the storage site of the trailer bodies.

Another object of the invention is to provide a portable mobile washing device of the character described wherein the operational efficiency of the device is improved by providing spring mounted brushes which apply constant pressure on the sides of the trailer body, means to gently lay down the hoses feeding the spray pipes throughout the complete to and fro movement of the device and thus avoid dragging or tangling of the hoses, and selectively operable swivel means to permit steering of the device in close quarters as for example where there are tight rows of trailer bodies.

These and other objects of the invention will become more apparent as the following description proceeds in conjunction with the accompanying drawings, wherein:

FIG. 1 is a diagrammatic view illustrating the transportation of the device to the trailer cleaning site;

FIG. 2 is a diagrammatic view of the device in position for cleaning;

FIG. 4 is a side elevational view taken thereof;

FIG. 5 is an enlarged detail view, some parts shown in section, of the guidance mechanism;

FIG. 6 is a sectional view taken on the line 6—6 of FIG. 5;

FIG. 7 is a perspective view of the hose handling mechanism;

FIG. 8 is a wiring diagram of the guidance control circuit; and

FIG. 9 is a diagrammatic view of the means for delivering cleaning fluid and water to the spray pipes carried by the device.

Specific reference is now made to the drawings in which similar reference characters are used to indicate the same elements throughout.

Figure 3:
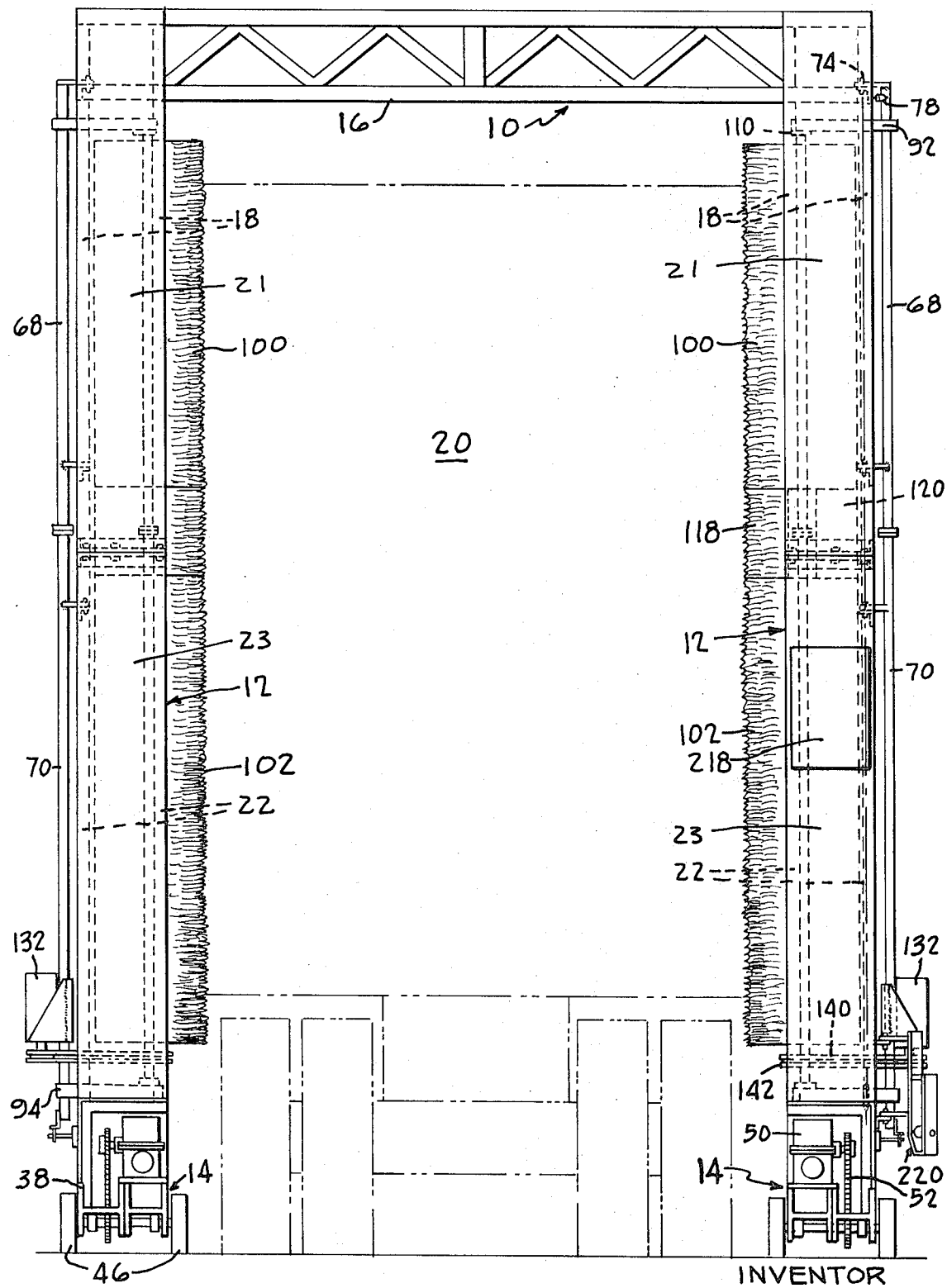
FIG. 3 is front elevational view of the device in the cleaning position.

The device comprises essentially a sectional frame on wheels equipped with spray pipes and brushes and adapted to straddle the vehicle and guidingly move from one end of the vehicle to the other and back to effect the cleaning thereof. The frame includes an upper bridging section 10 and two lower vertical sections 12 mounted on wheeled bases 14. The frame is fabricated of suitable metal, such as steel or aluminum. The bridging member 10 comprises essentially a pair of trussed horizontally extending members 16 secured at the top of spaced interconnected vertical angle irons 18 to thus form an open trussed U-shaped frame of width sufficient to transversely straddle the vehicle or trailer body 20 to be cleaned.

Each of the lower frame members 12 comprises essentially interconnected vertical angle irons 22 whose lower ends are secured upon each wheeled base. The front, rear and outside faces of the upper bridging frame 10 is covered with a suitable thin metallic skin 21 and similarly the front, rear and outside faces of the lower frame members 12 are covered with a skin 23.

As shown in FIG. 1, unassembled, the frame members 10 and 12 are compactly placed on a flat bed trailer 24 to which a rear ramp 26 may be attached and which is hitched to a truck 28 that is in turn equipped with a hoisting boom 30 and means to controllably deliver cleaning fluid and water to the sprays carried by the frames, as will appear hereinafter. After the truck has arrived at the cleaning site, the lower frame members are rolled off the flat bed trailer 24 and the upper frame member is raised by the boom above the lower members and removably connected thereto by bolts and nuts 32 which are made to extend through flanges 34 and 36 which are provided at the lower and upper ends of the angle members of the upper and lower frames, respectively.

Each base member 14 is a generally elongated rectangular member made preferably of connected I-beams 38 carrying axles 40 and 42 at their front and rear mounting sets of tired wheels 44 and 46. A reversible motor 48 is mounted at the rear of the base whose shaft is operatively connected to a reducer 50 which is in turn connected by suitable sprockets and chains 52 to the rear wheels 46.

At the front end of the base in advance of the front wheels, another motor 54 is mounted via a bracket 56 which also mounts a vertical guide tube 58 in which extends slidably a rod 60. The motor 54 operates a push-pull shaft 62 which is secured upon an angle bracket 64 carried by the base and which in turn mounts a pair of swivel caster wheels 66. Thus if it is desired to steer the device, once erected, from one narrow lane of the trailer bodies to another, the motor 54 will be operated to cause the casters 66 to engage the ground and raise only the front wheels 44 out of ground engagement.

Extending vertically on the outside of each frame section are pipes or rods 68 and 70 which are coupleable as at 72 to form a continuous member along the entire height of the assembled frame structure. At the bridging member 16 substantially centrally thereof is affixed a bracket which mounts a vertical pin 74 upon which is pivoted a bar 76 which extends through an aperture in the skin and is affixed to the upper end of the rod 68. Preloaded springs 78 and 80 are each terminally secured to the rod 68 below the bar 76 and to portions of frame angle irons 12 as at 82, see FIG. 4.

For additional security, further plates 84 and 86 are secured respectively to the lower end of the rod section 68 and the upper end of the rod section 70, which plates extend through suitable apertures in the skin and are pivoted as at 88 and 90 about vertical pins carried by brackets mounted on the angle members 12.

Below the bar 76, the rod section 68 secures a longer bar 92 which extends through a suitable aperture in the skin and adjacent its lower end the lower rod section 70 secures an arm 94 which extends through a suitable aperture in the skin. Intermediate its ends, the arms 94 is pivoted on a vertical pin 96 carried by a suitable bracket 98 carried by the frame.

A pair of upper and lower brushes 100 and 102 are provided for each side of the frame. Both brushes include a wooden core 104 mounting long, preferably nylon, flexible bristles 106 of cruciform cross-section for better fluid retention and wiping action. The core of the upper brush 100 is secured on a shaft 108 which is rotatably journaled at its upper end in a suitable bearing 110 carried by bar 92 and the core of the lower brush 102 is secured on a shaft 112 upon which, near its lower end, is secured a flange member 113 which bears on a suitable radial thrust bearing 114 carried by the arm 94 and into which the lower end of shaft 112 is rotatably journaled. When the brush shaft 108 and 112 are coupled top to bottom as at 116 a continuous shaft to rotate the vertically aligned brushes in unison is produced.

To insure continuity of brush surface an additional brush section is provided consisting of two halves 118 and 120 whose wooden cores 122 and 124 have cutouts 126 and 128 that receive the shaft coupling 116, the brush halves 118 and 120 being adapted for coupling to each other by suitable bolts 130.

A motor 132 is mounted on the lower rod 70 by means of a suitable bracket 134, the vertical shaft 136 of which carrying a pulley 138 over which is trained a belt 140 which is in turn trained over another pulley 142 carried by the lower brush shaft 112.

Secured as at 144 and 146 to both sides of the lower end of the rod 70 are preloaded springs 148 and 150 which are in turn secured as at 152 and 154 to a horizontal member 156 of the frame. The lower end of the rod 70 secures a bracket 158 carrying spaced vertical pins 160 and 162 which straddle the movable control arm 164 of a control switch 166 mounted on the frame beneath the bracket for a purpose soon to appear.

In advance of the brushes in the forward travel of the device, the frame sections mount spray equipment. Referring particularly to FIG. 9, a pair of risers 168 and 170, one for water and one for an admixture of acid or cleaning solution and water are mounted in one frame section, say the right-hand one, and extends to the middle of the bridging member 16 where, via two T-couplings 172 and 174 they connect to downwardly extending end-capped pipes, two of them 176 and 178 being disposed on the right-hand side of the frame and the other two 180 and 182 being disposed on the left-hand side of the frame. It will be understood that while reference is made to an acid-water mixture, especially useful for cleaning aluminum trailer bodies, mixtures of cleaning solutions and detergents can be substituted for the acid for the cleaning of painted surfaces, etc.

At the truck, water from a tank 184 is fed by a low pressure high volume pump 186 through a T-coupling 188 to a hose reel 190. At the same time acid from a tank 192 is fed by a high pressure low volume pump 194 to the T-coupling through a metering valve 196. The cable 198 leads to the cleaning frame or device where it is coupled by a suitable connector 200 to the pipes on the device. The hose connects with a T-coupling 202 on the device, one branch of which connects with the acid-water riser 170 through a valve 204, the other branch of which connects to the water riser 168 via another valve 206. Thus on the forward trip of the device, valve 204 is opened and valve 206 is closed whereby acid and water flow up riser 170 and down the branch spray pipes 176 and 182 to spray the acid-water mixture on the sides of the trailer body in advance of the engagement of the brush bristles with the trailer body. On the reverse trip, valve 204 is closed and valve 206 opened whereupon water alone will flow up riser 168 and down the spray pipes 178 and 180 to spray rinse water on the sides of the trailer body in advance of the engagement of the brush bristles with the trailer body.

A generator 208 is provided on the truck which is operatively connected to an on-off switch 210 to the brush motor 132. The truck also mounts forward and reverse switches 212 and 214 which by suitable cable 216 enters a control box 218 on the frame, the cable 216 being tied to and therefore paying off with the hose 198 from the reel 190. To lay the hose and cable down, smoothly as the device moves to and fro in the washing operation, a bracket 200 is pivoted for swinging movement about a vertical axis as at 222 to one side of the frame adjacent its lower end, preferably adjacent the brush motor 132, the bracket including a horizontal roller 224 retained in a closed framework 226 over which roller the cable-hose unit extends, see FIG. 7. As the device moves out, the hose and cable as it pays out is picked up in front of the roller and layed down gently on the ground to the rear thereof.

The remaining electrical components and circuitry are mounted in the control box 218. As will be seen in FIG. 8, each reversible motor 48 is grounded on one side and is connected to the power supply or generator 208 by two separate lines 232 and 234, one forward and the other reverse, via a relay 236. When switch 214 is closed, the coil 238 of relay 236 will be energized to close contacts 240 and thus drive the motors 48 in a forward direction. If the device straddles the vehicle body and is properly aligned therewith it will pass from the front to the rear of the vehicle body and back in the washing and rinsing operation. However, if there should be misalignment, the device will automatically guide itself because the other side of the coil 238 passes through a normally closed thermal relay 242 which is grounded. If one side of the frame is closer to the vehicle body than it should be, the brush on that side lags by increased friction against the trailer body. This pivots arm 94 so that one or the other pin 160 or 162 engages the arm 164 in control switch 166 and moves it into engagement with the contact 244 or 246. This opens the normally closed points of the thermal relay 242 to shut off the power to the motor 48 on that side of the device. But the motor 48 on the other side of the device keeps running so that the device is thereby caused to realign itself with the trailer body as it moves along. Depending upon the degree of misalignment, in the first place, the action in reestablishing the desired alignment of the device relative to the vehicle body will result from short pulses in which the contact points in the flasher-type thermal relay are opened and closed.

When the device reaches the end of the vehicle body, the operator at the truck opens switch 214 to stop both motors 48 and then closes switch 212 which causes the motors to reverse themselves and the device, the guidance control mechanism acting to keep the device properly aligned with the vehicle body in the reverse pass as well as in the forward pass. By adjusting the valves shown in FIG. 9 as described hereinbefore, an acid-water mixture or other cleaning solution is sprayed on the sides of the vehicle body in the forward pass with the brushes applying proper abrasive action to remove dirt and film and rinse water is sprayed on the reverse pass with the brushes acting to complete the removal of the dirt and film. It will be understood that the springs 78, 80, 148 and 150 are so preloaded that the brushes are held so that they do not cause the springs to yield during the normal wiping operation. One pair of springs 78, 148 extends while the other pair 80, 150 relaxes primarily only when, as aforesaid, one side of the device is askew and the brushes on that side engage the side of the vehicle body to cause frictional lag which causes the motor on that side to stop and start in pulses while the motor on the other side keeps running to realign the device with the vehicle body.

While preferred embodiments of the invention have here been shown and described, it will be understood that minor variations may be made without departing from the spirit of the invention and the scope of the appended claims.

I claim:

1. A self-propelled device for cleaning vehicle bodies comprising an inverted substantially U-shaped member adapted to span a vehicle body including an upper bridging member and depending leg portions, wheeled bases secured to the bottom of said leg portions including reversible motors to drive the same, brushes, means rotatably mounting said brushes vertically on said leg portions so that a portion of the bristles extends inwardly beyond said leg portions, spray pipes carried by said leg portions along their height and in advance of said brushes, means to deliver fluid to said pipes to clean and rinse the vehicle body, motors to rotate said brushes, and guidance means coactive between said brush mounting means and said motors driving said wheeled bases to direct said cleaning member in its movement from one end of a vehicle body to the other and back so that when said device is disaligned relative to the vehicle body, the frictional drag of the brush on one side of the vehicle body will stop the wheeled base motor on that side of the device only while the wheeled base motor on the other side of the device keeps running to cause realignment of the device and the vehicle body.

2. A self-propelled device for cleaning vehicle bodies comprising an inverted substantially U-shaped member adapted to span a vehicle body including an upper bridging member and depending leg portions, wheeled bases secured to the bottom of said leg portions including reversible motors to drive the same, brushes, means rotatably mounting said brushes vertically on said leg portions so that a portion of the bristles extends inwardly beyond said leg portions, spray pipes carried by said leg portions along their height and in advance of said brushes, means to deliver fluid to said pipes to clean and rinse the vehicle body, motors to rotate said brushes, and guidance means coactive between said brush mounting means and said motors driving said wheeled bases to direct said cleaning member in its movement from one end of a vehicle body to the other and back, said brush mounting means including arms extending laterally of each leg portion adjacent the top and bottom thereof, said brush including a shaft terminally journaled for rotation on said arms, a rod connecting said arms, means resiliently mounting said rod for swinging movement on said leg portion, said guidance means including means coactive between said rod and the power supply to the wheeled base motor so that when the device is disaligned the frictional drag of the brush on one side of the vehicle body will cause said rod to swing in one or another direction and cut off the power to the wheeled base motor on that side of the vehicle body while the wheeled base motor on the other side of the device keeps running.

3. The combination of claim 2 wherein said means coactive between said rod and the power supply to the wheeled base motor includes a switch with a movable contact arm operatively connected to a normally closed relay which is in turn operatively connected to the power supply and fingers carried by one end of the rod straddling said movable contact arm so that when the device is askew on said one side of the vehicle, one or the other of said fingers will move said contact arm to a position causing the normally closed relay contacts to open and interrupt the power to the wheeled base motor on said one side of the device while the wheeled base motor on the other side keeps running.

4. The combination of claim 3 wherein said relay is a thermal relay whose contacts open and close intermittently so that the wheeled base motor on said one side of the device will stop and start intermittently to realign the device with the vehicle body.

5. A self-propelled device for cleaning vehicle bodies comprising an inverted substantially U-shaped member adapted to span a vehicle body including an upper bridging member and depending leg portions, wheeled bases secured to the bottom of said leg portions including reversible motors to drive the same, brushes, means rotatably mounting said brushes vertically on said leg portions so that a portion of the bristles extends inwardly beyond said leg portions, spray pipes carried by said leg portions along their height and in advance of said brushes, means to deliver fluid to said pipes to clean and rinse the vehicle body, motors to rotate said brushes, and guidance means coactive between said brush mounting means and said motors driving said wheeled bases to direct said cleaning member in its movement from one end of a vehicle body to the other and back, each wheeled base including sets of front and rear tired wheels, swivel caster wheels carried by said base, and means to elevate one set of wheels above the ground and lower said swivel caster wheels into ground engagement to assist in manually steering the device in narrow lanes.

6. The combination of claim 5 wherein said means to elevate one set of wheels includes a motor mounted on said wheeled base including a push-pull shaft connected to said caster wheels.

7. A self-propelled device for cleaning vehicle bodies comprising an inverted substantially U-shaped member adapted to span a vehicle body including an upper bridging member and depending leg portions wheeled bases secured to the bottom of said leg portions including reversible motors to drive the same, brushes, means rotatably mounting said brushes vertically on said leg portions so that a portion of the bristles extends inwardly beyond said leg portions, spray pipes carried by said leg portions along their height and in advance of said brushes, means to deliver fluid to said pipes to clean and rinse the vehicle body, motors to rotate said brushes, and guidance means coactive between said brush mounting means and said motors driving said wheeled bases to direct said cleaning member in its movement from one end of a vehicle body to the other and back, a hose connected to said spray pipes and electrical cable operatively connected to said motors, and means on said device engaging said hose and cable to lay them down without entanglement as they pay out or are retracted with the to and fro movement of the device relative to the vehicle body, said means to lay down said hose and cable including a bracket pivoted to one leg portion of the device, a roller carried by said bracket engaging said hose and cable and means to confine said hose and cable on said roller.

8. A self-propelled device for cleaning vehicle bodies comprising an inverted substantially U-shaped member adapted to span a vehicle body including an upper bridging member and depending leg portions, wheeled bases secured to the bottom of said leg portions including reversible motors to drive the same, brushes, means rotatably mounting said brushes vertically on said leg portions so that a portion of the bristles extends inwardly beyond said leg portions, spray pipes carried by said leg portions along their height and in advance of said brushes, means to deliver fluid to said pipes to clean and rinse the vehicle body, motors to rotate said brushes, and guidance means coactive between said brush mounting means and said motors driving said wheeled bases to direct said cleaning member in its movement from one end of a vehicle body to the other and back, said U-shaped member being in the form of a frame and a skin secured thereon covering only the front, rear and outside surfaces thereof, said frame being sectional to render it compact for transportation to the cleaning site, the bridging member and the upper parts of the leg portions constituting an upper unit and being boltable to the lower parts of the leg portions as the other lower unit, the spray pipes and brushes also being divided into sections mounted in said upper and lower units and being coupleable when the upper unit is mounted on the lower unit.

9. The combination of claim 8 wherein each brush section includes a shaft, a core secured thereon and bristles carried by said core, means coupling the lower end of said shaft of said brush in said upper unit to the upper end of said shaft of said brush in said lower unit and an additional brush section to fill in the gap between the coupled brushes to provide a substantially continuous brush surface, said additional brush section including two halves of a core mounting bristles, said halves being attached to each other and to one of said brush shafts and including a recess receiving said coupling means.

10. The combination of claim 8 and a truck to transport said device including means to hoist said upper sectional unit and position it over said lower sectional unit for attachment of the units to each other.

11. The combination of claim 10 wherein said truck also includes a power source, fluid supply tanks, pumps operatively connected thereto, a hose and cable reel, valve control means to feed fluid to said hose and switches to connect the power source with said motors so that the movement of the device and the cleaning cycle can be remotely controlled.

References Cited

UNITED STATES PATENTS

| | | | |
|---|---|---|---|
| 2,865,034 | 12/1958 | Petite | 15—53 |
| 3,300,803 | 1/1967 | Seakan | 15—21 |
| 3,425,080 | 2/1969 | Dolitzsch et al. | 15—21 |
| 3,428,983 | 2/1969 | Seakan | 15—21 |

EDWARD L. ROBERTS, Primary Examiner

U.S. Cl. X.R.

15—53